United States Patent [19]

Sato et al.

[11] Patent Number: 5,232,174
[45] Date of Patent: Aug. 3, 1993

[54] REEL MOUNTING STRUCTURE

[75] Inventors: Koji Sato, Fussa; Junichi Ide, Fuchu, both of Japan

[73] Assignee: Kabushiki Kaisha Shinkawa, Tokyo, Japan

[21] Appl. No.: 907,666

[22] Filed: Jul. 2, 1992

[30] Foreign Application Priority Data

Jul. 3, 1991 [JP] Japan .................. 3-189137

[51] Int. Cl.⁵ ............................................ B65H 18/04
[52] U.S. Cl. ...................................... 242/68.3; 242/73
[58] Field of Search ............... 242/68.3, 73, 68.1, 242/71.9, 129.5, 129.7, 129.71, 129.72

[56] References Cited

U.S. PATENT DOCUMENTS

| | | | |
|---|---|---|---|
| 221,395 | 11/1879 | Cass | 242/73 |
| 862,109 | 7/1907 | Roth | 242/73 |
| 2,889,123 | 6/1959 | Hayden | 242/68.3 |
| 3,829,034 | 8/1974 | Mickelson | 242/68.3 |
| 3,960,337 | 6/1976 | Schroeder et al. | 242/68.3 |
| 4,037,769 | 7/1977 | Meyers | 242/73 X |
| 4,183,475 | 1/1980 | Martija | 242/68.3 |
| 4,434,947 | 3/1984 | Focke | 242/68.3 X |

*Primary Examiner*—John M. Jillions
*Attorney, Agent, or Firm*—Koda and Androlia

[57] ABSTRACT

A structure for mounting reels on a tape supply device used, for example, in a tape bonding machine without the use of spacers including a sleeve, a cylindrical grooved cam which has a pair of grooves that are opposite in circumferential directions and is rotatably fitted over the sleeve, a reel-holding plate which is rotatably and slidably provided on the grooved cam, a reel shaft inserted into the sleeve so that the reel shaft can rotate and slide in the axial direction, and a movement-transmitting assembly which moves the reel-holding plate and reel shaft in opposite directions when the grooved cam is turned so that a portion on the reel shaft on which a tape reel is fitted can be changed to any desired length.

2 Claims, 3 Drawing Sheets

REEL MOUNTING STRUCTURE

BACKGROUND OF THE INVENTION

1. Field of the Invention

The present invention relates to a reel mounting structure for a tape bonding machine, tape inspection apparatus, etc.

2. Prior Art

A prior art tape supply device used, for example, in a tape bonding machine is shown in FIG. 6.

A tape supply section 10 and a tape accommodation section 20 which have roughly the same structure are provided on either side of the tape bonding machine 30. A tape 31 and a spacer tape 32 are wound together on a tape supply reel 11, and a spacer tape take-up reel 15 takes up the spacer tape 32 when the tape 31 is reeled off. A tape take-up reel 21 takes up the tape 31 together with the spacer tape 32 which is fed out of the spacer tape supply reel 25. Guide rollers 12 and 22 guide the tape 31, and tension rollers 13 and 23 apply tension to the tape 31 so that the tape 31 is kept horizontally.

Rotatable tension rollers 13 and 23 are attached to the ends of dancer arms 17 and 27 which are rotatably mounted on supporting shafts 16 and 26. Springs 18 and 28 are attached at the opposite ends of the dancer arms 17 and 27 so that the tension rollers 13 and 23 can apply tension to the tape 31 via the springs 18 and 28.

With the above structure, the tape 31 from the tape supply reel 11 is fed into the bonding machine 30 via the guide roller 12, the tension roller 13 and the guide 14. The tape 31 is inspected or used (for bonding) by the bonding machine 30 and then taken up by the tape take-up reel 21 via the guide 24, the tension roller 23 and the guide roller 22. The spacer tape 32 on the tape supply reel 1 is separated from the tape 31 and taken up by the spacer tape take-up reel 15. When the tape 31 is wound on the tape take-up reel 21, the spacer tape 33 which is supplied from the spacer tape supply reel 25 is also wound on the take-up reel 21.

Tape supply/take-up structures of this type are disclosed in, for example, Japanese Patent Application Kokai Nos. 58-165335 and 63-20846, and one of the conventional ways to mount tape supply and tape take-up reels in a wire bonding machine is shown in FIG. 5.

More specifically, a reel shaft 43 is fastened to the output shaft 42a of a motor 42. The motor 42 is mounted to the base plate 40 of the bonding machine via a bracket 41. A reel 44 and spacers 45 and 46, which are used for a reel width adjustment, are mounted on the reel shaft 43 so that they are on both sides of the reel 44. The reel 44 and spacers 45 and 46 are secured on the reel shaft 43 by a stopper 47 which is rotatably installed at the end of the reel shaft 43.

In this prior art structure, a space which would be derived from the difference between the width of the reel and the length of the reel shaft 43 used for reel mounting is compensated (or filled) by the spacers 45 and 46. Accordingly, when a reel of different width is used, the spacers need to be replaced with those which can suit the new reel. In other words, different size spacers are necessary for reels of different sizes, and they must be stored near the bonding machine. Also, the spacers need to be replaced every time the reel of a different size is used.

SUMMARY OF THE INVENTION

The object of the present invention is to provide a mounting structure for reels which requires no spacer exchange and allows the length of the reel mounting portion of the reel shaft to be altered via a one-touch operation so that the length of the reel shaft for mounting reels thereon can match any reels of different sizes.

The structure of the present invention to achieve the object includes: a sleeve, a grooved cam which is fitted over the circumference of the sleeve in a manner that the grooved cam is rotatable, a reel-holding plate which is fitted on the circumference of the grooved cam so that the reel-holding plate is rotatable and slidable, a reel shaft which is inserted into the sleeve so that the reel shaft is rotatable and slidable, and a movement-transmitting means which moves the reel-holding plate and the reel shaft in opposite directions when the grooved cam is turned.

In operation, when the grooved cam is turned, the movement-transmitting means causes the reel-holding plate and the reel shaft to move in opposite directions; accordingly, the space between the reel-holding plate fitted on the grooved cam and a stopper attached to the tip of the reel shaft, i.e., the length of reel mounting portion of the reel shaft, can be changed to any desirable amount.

DETAILED DESCRIPTION OF THE INVENTION

One embodiment of the present invention will be described below with reference to FIGS. 1 through 4.

Figure 1:
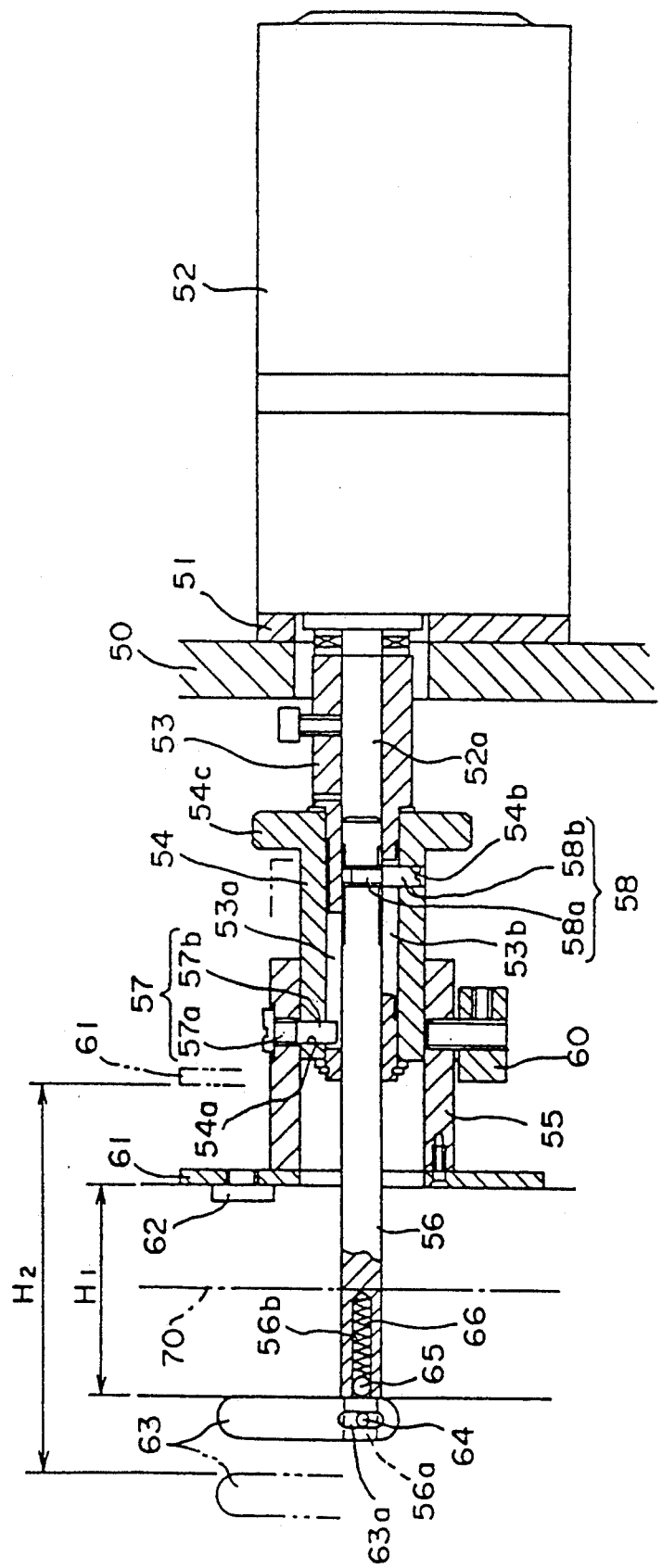
FIG. 1 shows a cross section of one embodiment of the reel mounting structure of the present invention.
Figure 2:
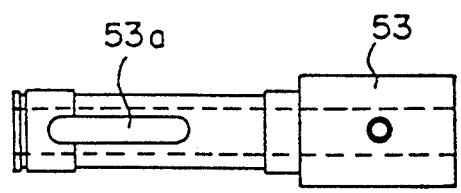
FIG. 2(a) is a top view of the sleeve used in the structure shown in FIG. 1.
FIG. 2(b) is a bottom view thereof.
Figure 2:
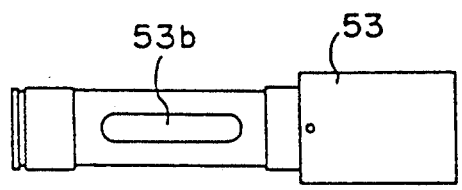

As shown in FIG. 1, a motor 52 is mounted to base plate 50 of a bonding machine via a bracket 51. A cylindrical sleeve 53 is fastened to the output shaft 52a of the motor 52. FIG. 2 shows the sleeve 53. The sleeve 53 has guide grooves 53a and 53b which extend in the axial direction. The grooves 53a and 53b are formed on diametrically opposite sides of the sleeve 53.

Figure 3:
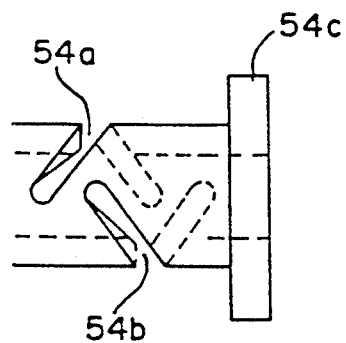
FIG. 3 is a front view of the grooved cam used in the mounting structure.

Back to FIG. 1, a cylindrical grooved cam 54 is mounted on the circumference of the sleeve 53 in a manner that the grooved cam 54 is rotatable. As shown in FIG. 3, the grooved cam 54 is provided with lead grooves 54a and 54b so that these grooves 54a and 54b positionally correspond to the guide grooves 53a and 53b. The lead grooves 54a and 54b each run around 180 degrees on the circumference of the grooved cam 54, and the lead directions of the lead grooves 54a and 54b are opposite to each other. In other words, the lead groove 54a has a "left lead" direction in FIG. 3, and the lead groove 54b has a "right lead" direction.

Back again to FIG. 1, a collar 55 is fitted over the circumference of the grooved cam 54. The collar 55 is rotatable and slidable relative to the grooved cam 54.

A reel shaft 56 is inserted into the sleeve 53 so that the reel shaft 56 is rotatable and slidable inside the sleeve 53.

Reference numeral 57 indicates a first guide pin. The threaded portion 57a of the first guide pin 57 is screwed to the collar 55. The guide portion 57b of the first guide pin 57 passes through the lead groove 54a of the grooved cam 54 and brought into the guide groove 53a of the sleeve 53. A second guide pin 58 is screwed into the reel shaft 56 via its threaded portion 58a. The guide portion 58b of the second guide pin 58 locates in the guide groove 53b of the sleeve 53 and in the lead groove 54b of the grooved cam 54.

A locking screw 60, which positions the collar 55 relative to the grooved cam 54, is screwed into reel-holding plate 61 which comes into contact with one side of a reel (not shown) is attached to the end of the collar 55. A plurality of (only one shown) positioning pieces 62, which are inserted into holes formed in the side wall of the reel, are screwed into the reel-holding plate 61. The positioning pieces 62 are removable from the reel-holding plate 1.

Figure 4:
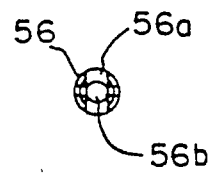
FIG. 4 is a side view of the reel shaft used in the structure.
Figure 5:
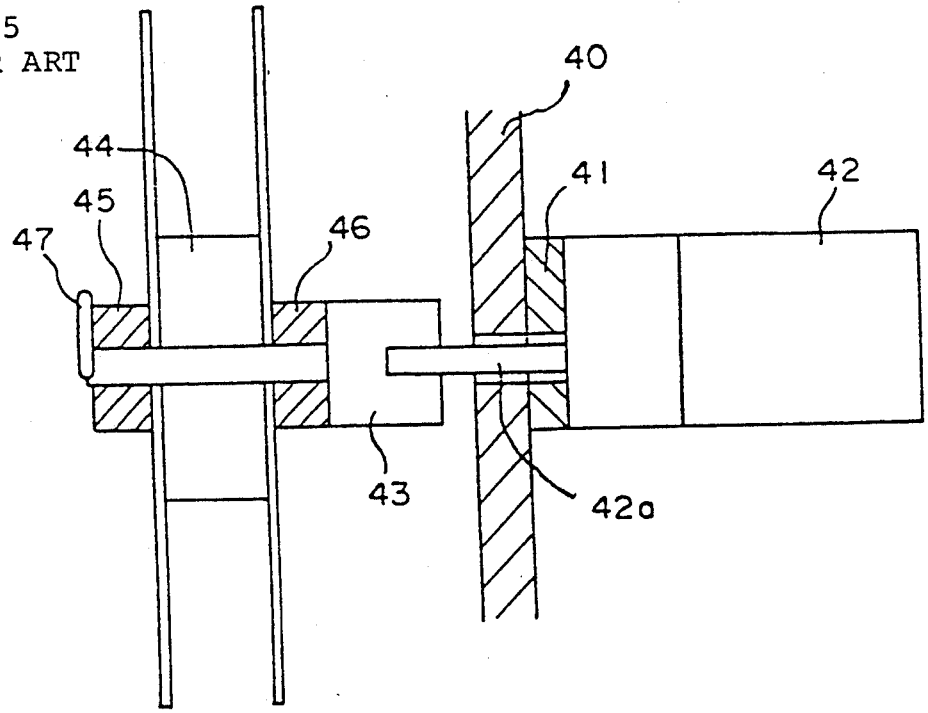
FIG. 5 is a cross section of a conventional reel attachment structure.
Figure 6:
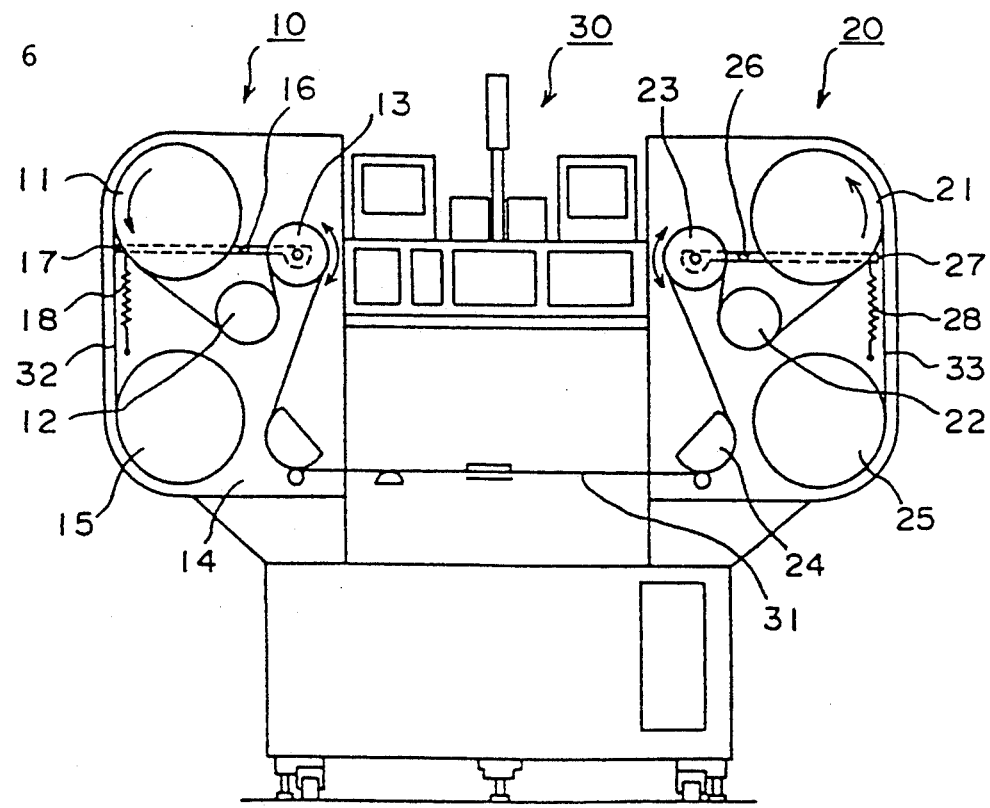
FIG. 6 is a rough structural diagram which illustrates one example of a bonding machine.

As shown in FIG. 4, a split groove 56a is formed at the end of the reel shaft 56. A stopper 63 is inserted into this split groove 56a (see FIG. 1). The stopper 63 has a slot 63a, and a pin 64 which is fastened to the split-groove 56a of the reel shaft 56 is inserted into this slot 63a.

The reel shaft 56 is also provided with a hole 56b which runs inwardly from the split groove 56a. A ball 65 and a spring 66 which presses the ball 65 against the stopper 63 are installed in this hole 56b.

With the structure above, when the motor 52 is started, the rotation of the output shaft 52a is transmitted to the sleeve 53 and then to the collar 55 and reel-holding plate 61 via the guide pin 57. The rotation of the sleeve 53 is also transmitted to the reel shaft 56 via the guide pin 58. Thus, the reel (not shown) mounted on the reel shaft 56 is rotated to feed out or take up the tapes.

The adjustment of the length for reel mounting of the reel shaft 56 will be described below.

FIG. 1 shows when a reel of smallest width is mounted on the reel shaft 56. Since the guide pins 57 and 58 are respectively inserted into the guide grooves 53a and 53b of the grooved sleeve 53, the collar 55 and reel shaft 56 do not rotate, but they can move along the guide grooves 53a and 53b. Accordingly, by loosening the locking screw 60 and then turning the knob 54c of the grooved cam 54 one direction (for example, to the right when viewed from the right side of FIG. 1), the guide pins 57 and 58 are caused to move to the right and left in FIG. 1 (or in the axial direction of the reel shaft 5 ), respectively. In other words, the pins 57 and 58 are moved in opposite directions. The distance the guide pins 57 and 58 are moved corresponds to the leads of the lead grooves 54a and 54b in accordance with the amount of turning of the groove cam 54.

As a result, the collar 55 and the reel shaft 56 are moved in opposite directions and therefore the reel-holding plate provided on the collar 55 and the stopper 63 provided on the reel shaft 56 are moved in opposite directions as indicated by the two-dot chain lines in FIG. 1. In other words, the length $H_1$ the reel mounting on the reel shaft 56 is changed to the length $H_2$ by turning the grooved cam 54. In FIG. 1, the length $H_1$ is the shortest, and therefore, for the smallest width reel; and the length $H_2$ is the longest, and therefore, for the largest width reel.

After an appropriate length for a reel mounting is obtained on the reel shaft 56 by the reel-holding plate 61 and the reel shaft 56 being moved in opposite directions, the locking screw 60 is tightened back so that the reel is mounted on the reel shaft 56 and then the stopper 63 is raised to securely hold the reel on the reel shaft 56.

Since the lead of the lead groove 54a and the lead of the lead groove 54b are formed at the same pitch as described above, the amount movement of the reel-holding plate 61 and the stopper are the same, and the center 70 of the tape flow can remain unchanged. In other words, when the grooved cam 54 is turned, the reel-holding plate 61 and the stopper 63 move in opposite directions with the center 70 of tape flow as a fixed (or unchangeable) reference line.

Accordingly, there is no need for using and therefore changing spacers which are required in the conventional tape supply devices, and the length necessary for reel mounting on the reel shaft 56 can be changed via a one-touch operation which is to turn the grooved cam 54 back and forth.

In the embodiment described above, the reel shaft 56 is rotated by the motor 52. However, if the reel shaft 56 is not rotated by the motor 52, the same can result by providing the sleeve 53 on the base plate 50 rotatably. In addition, in the embodiment above, the collar 55 and the reel-holding plate 61 are separate parts; however, these parts can be formed into a single unit.

As seen from the above, the reel mounting structure of the present invention includes a sleeve, a grooved cam rotatably fitted on the sleeve, a reel-holding plate which is fitted over the circumference of the grooved cam so that the reel-holding plate is rotatable and slidable, a reel shaft which is inserted into the sleeve so that the reel shaft is free to rotate and free to slide, and a movement-transmitting means which causes the reel-holding plate and the reel shaft to move in opposite directions when the grooved cam is turned. Accordingly, there is no need for replacing spacers, and the length of the reel shaft for mounting a reel thereon can be varied via a one-touch operation which brings the length for reel mounting to be matched with reels of different width.

We claim:
1. A structure for mounting a reel comprising:
   a sleeve;
   a grooved cam which is fitted over the circumference of said sleeve so that said grooved cam is free to turn;
   a reel-holding plate which is fitted over the circumference of said grooved cam so that said reel-holding plate is free to rotate and free to slide;
   a reel shaft which is inserted into said sleeve so that said reel shaft is free to rotate and free to slide; and
   a movement-transmitting means which causes said reel-holding plate and said reel shaft to move in opposite directions when said grooved cam is turned.

2. A structure according to claim 1, wherein said movement-transmitting means comprising:
   two guide grooves which are formed in said sleeve, said guide grooves extending in an axial direction of said sleeve;
   two lead grooves provided on said grooved cam, leads of said lead grooves being formed in opposite directions and said lead grooves being formed so as to correspond to said two guide grooves;

a first guide pin fastened to said reel-holding plate and inserted via one of said two lead grooves into one of said two guide grooves that correspond to said one of said lead grooves, and a second guide pin fastened to said reel shaft and inserted via another one of said two guide grooves into another one of said two lead grooves that corresponds to said another one of said guide grooves.

* * * * *